(12) United States Patent
Kanaya et al.

(10) Patent No.: US 8,599,341 B2
(45) Date of Patent: Dec. 3, 2013

(54) LIQUID CRYSTAL DISPLAY DEVICE AND ELECTRONIC EQUIPMENT

(75) Inventors: Yasuhiro Kanaya, Tokyo (JP); Koji Noguchi, Kanagawa (JP); Hironao Tanaka, Kanagawa (JP); Masumitsu Ino, Kanagawa (JP)

(73) Assignee: Japan Display West Inc., Aichi (JP)

( * ) Notice: Subject to any disclaimer, the term of this patent is extended or adjusted under 35 U.S.C. 154(b) by 338 days.

(21) Appl. No.: 12/328,317

(22) Filed: Dec. 4, 2008

(65) Prior Publication Data

US 2009/0147198 A1 Jun. 11, 2009

(30) Foreign Application Priority Data

Dec. 7, 2007 (JP) ................. 2007-317705

(51) Int. Cl.
*G02F 1/1333* (2006.01)
*G02F 1/1339* (2006.01)
(52) U.S. Cl.
USPC .......................................... 349/122; 349/153
(58) Field of Classification Search
USPC ................................. 349/153, 122
See application file for complete search history.

(56) References Cited

U.S. PATENT DOCUMENTS

| | | | |
|---|---|---|---|
| 6,943,863 B2* | 9/2005 | Fujioka et al. | 349/153 |
| 2005/0062898 A1* | 3/2005 | Imayama et al. | 349/43 |
| 2006/0139554 A1* | 6/2006 | Park | 349/152 |
| 2006/0221291 A1* | 10/2006 | Hong et al. | 349/153 |
| 2008/0123032 A1* | 5/2008 | Taniguchi et al. | 349/113 |

FOREIGN PATENT DOCUMENTS

| | | |
|---|---|---|
| JP | 06-186553 | 7/1994 |
| JP | 2000-347173 | 12/2000 |
| JP | 2003-121860 | 4/2003 |
| JP | 2003-167258 | 6/2003 |
| JP | 2003-272834 | 9/2003 |
| JP | 2005-234582 | 9/2005 |
| JP | 2007-256415 | 10/2007 |

OTHER PUBLICATIONS

Japanese Patent Office Action corresponding to Japanese Serial No. 2007-317705 dated Oct. 13, 2009.

* cited by examiner

*Primary Examiner* — Wen-Ying P Chen
(74) *Attorney, Agent, or Firm* — Dentons US LLP

(57) ABSTRACT

Disclosed herein is a liquid crystal display device including: a first substrate having a pixel area in which pixels are arranged in a matrix form; a second substrate disposed to be opposed to the first substrate; a liquid crystal layer disposed between the first and second substrates; a conductive section disposed at least on the first of the first and second substrates to apply a voltage to the liquid crystal; an organic film disposed at least over one of the first and second substrates; a sealing area adapted to hold the two substrates of the liquid crystal display device together at the peripheral portions of the first and second substrates; and an organic film-free area which is free from the organic film and extends from the inward side of the outermost end of the sealing area to the outward side of the outer periphery of the pixel area.

10 Claims, 13 Drawing Sheets

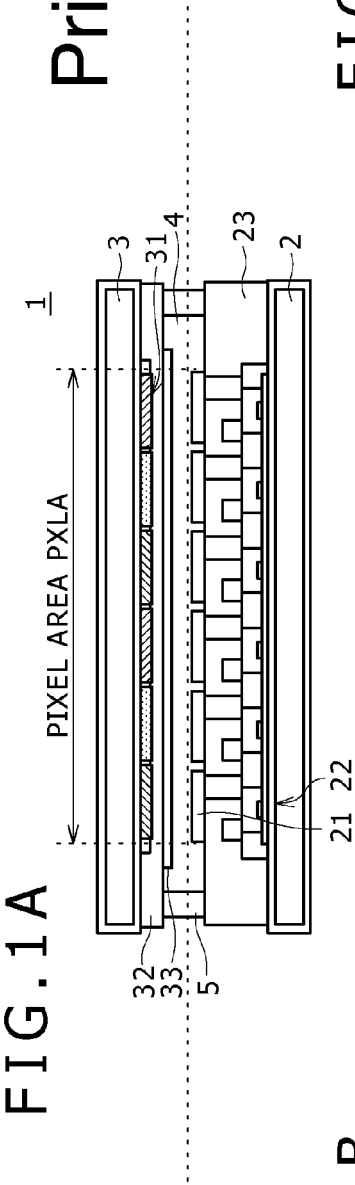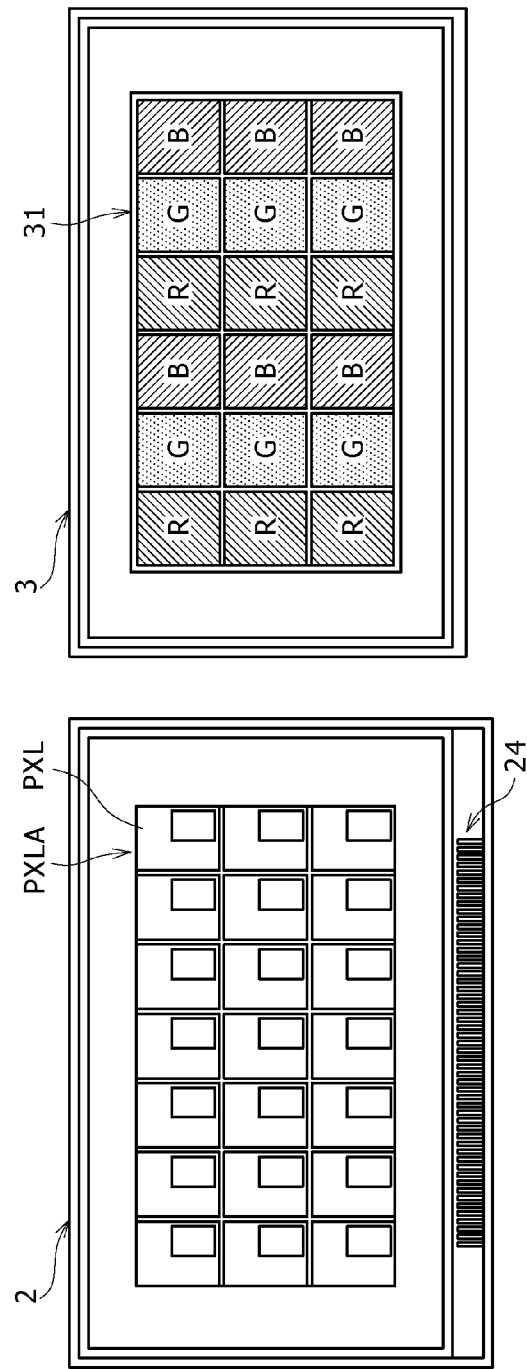

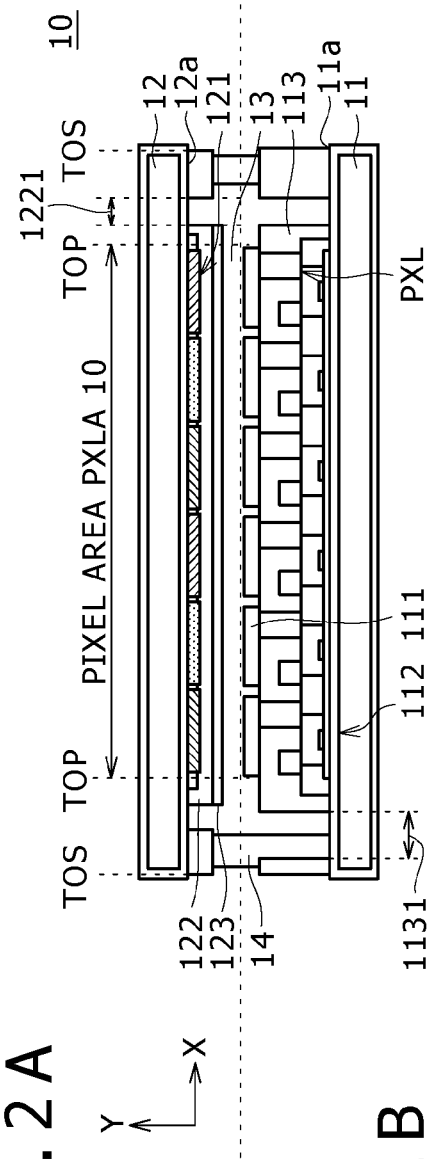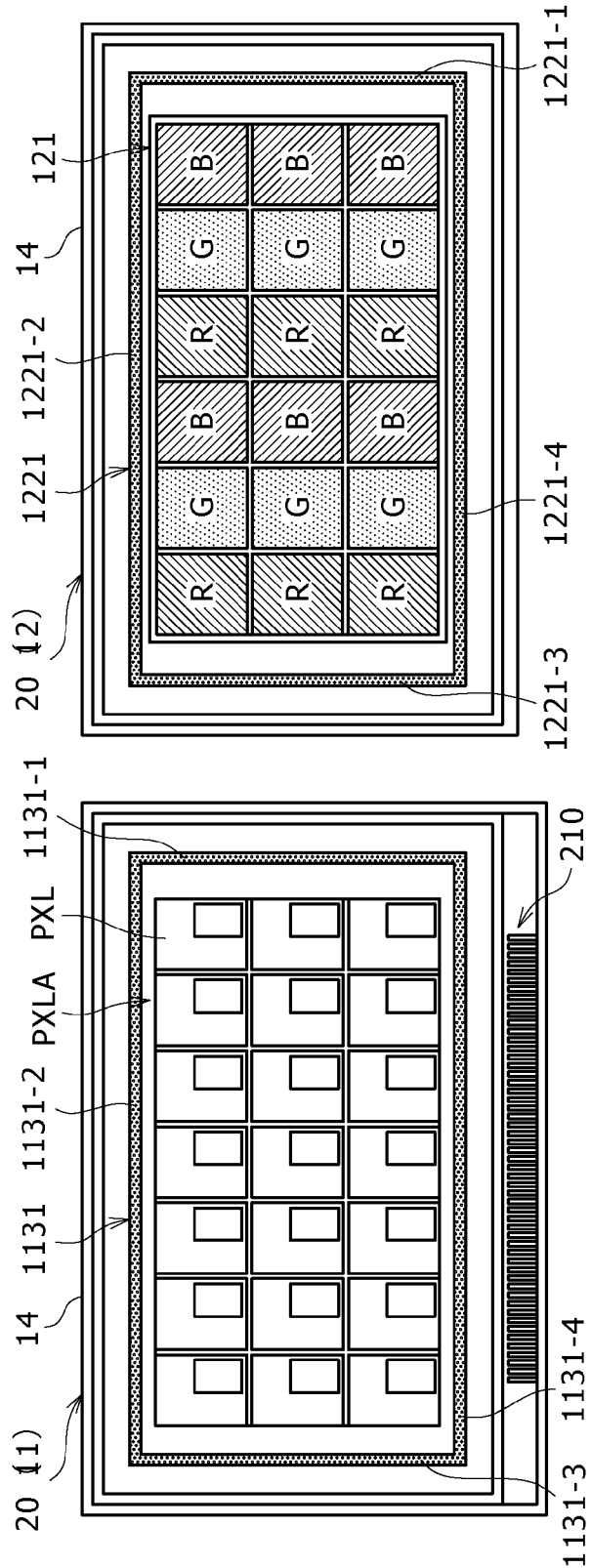

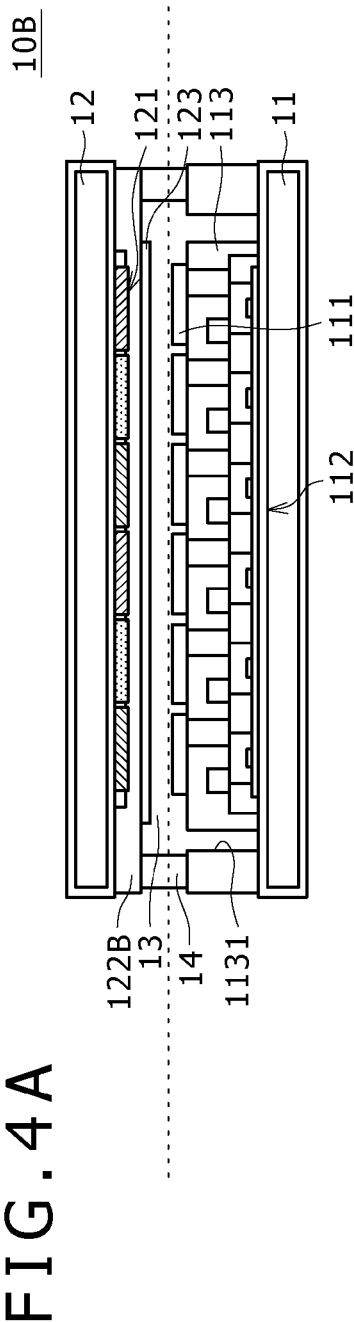
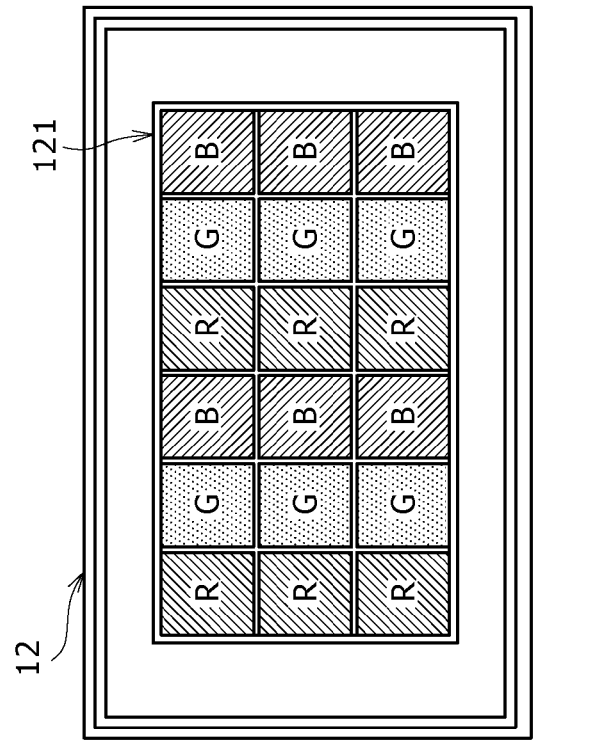
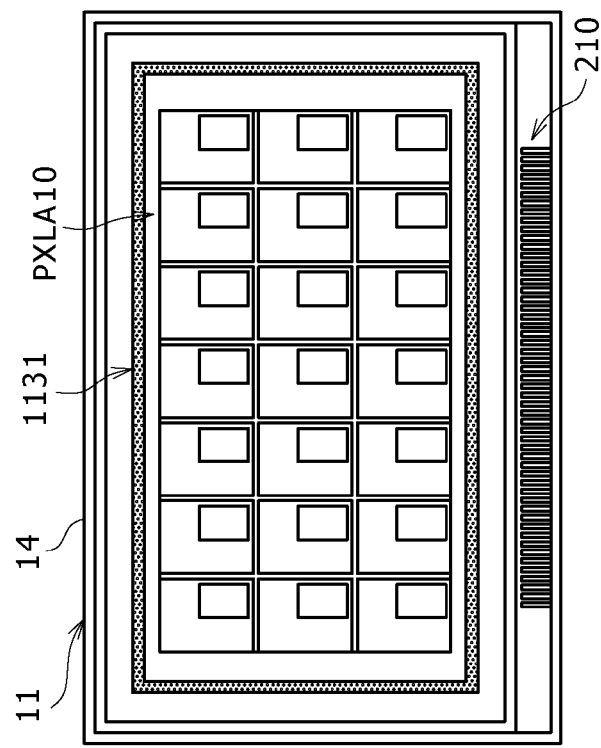
FIG.4A
FIG.4C
FIG.4B

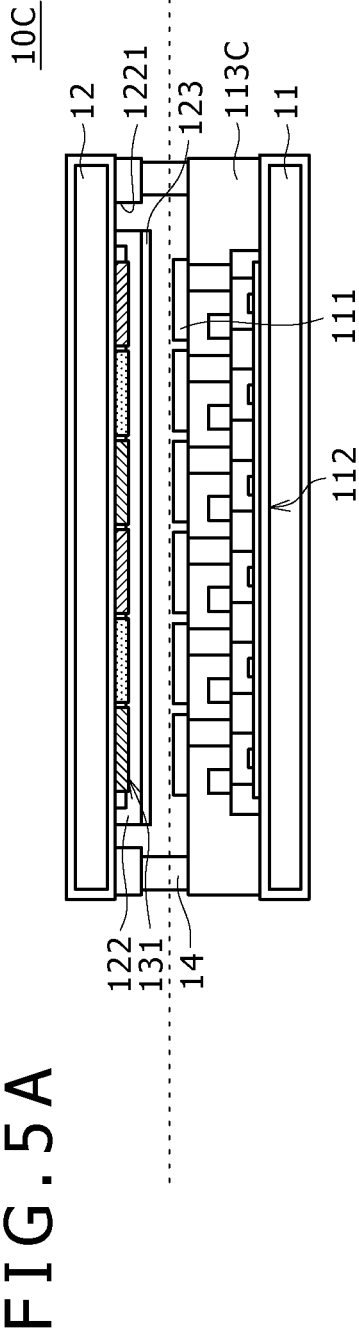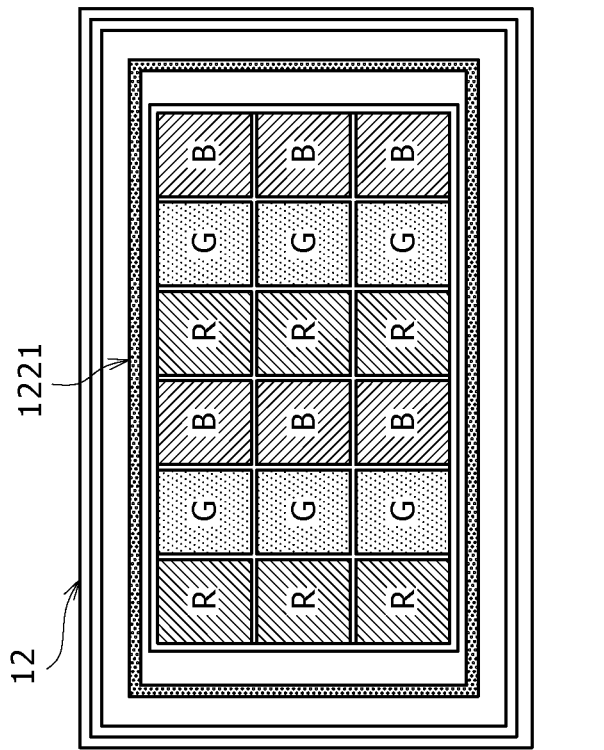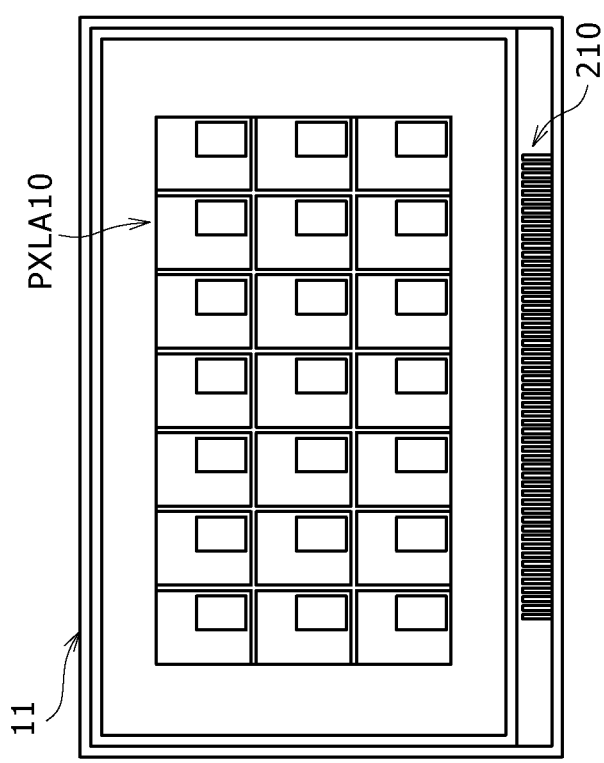

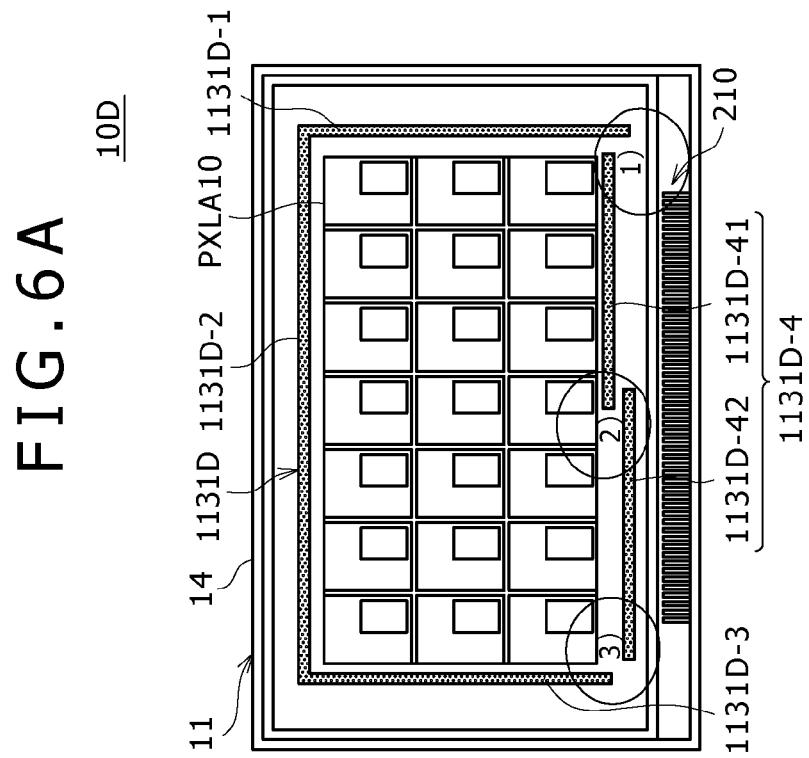
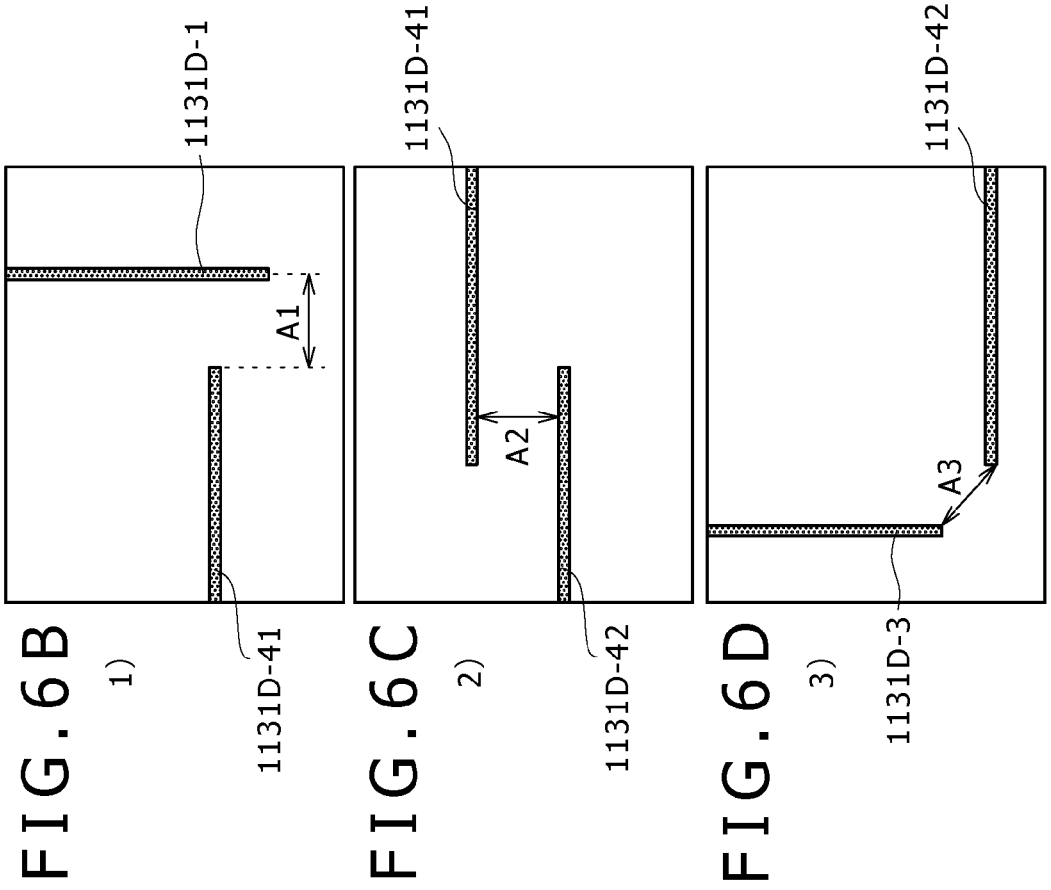

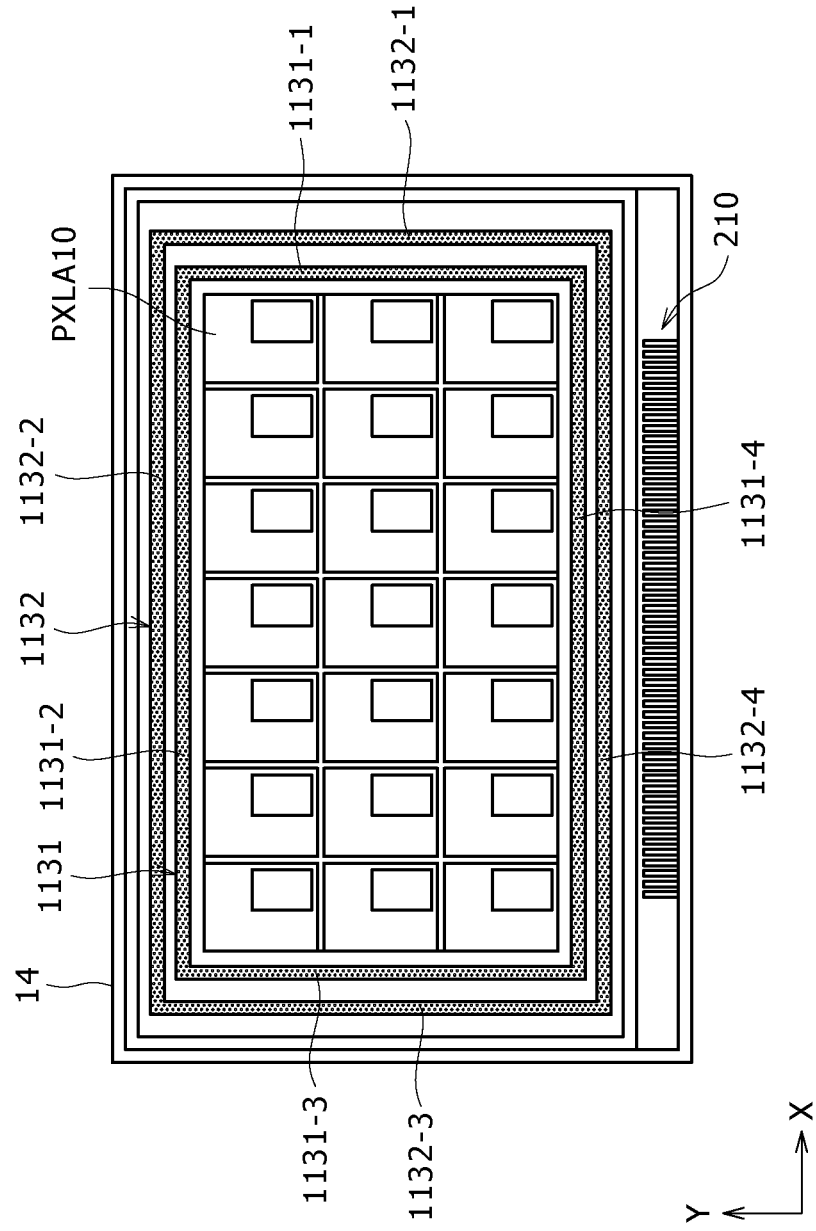

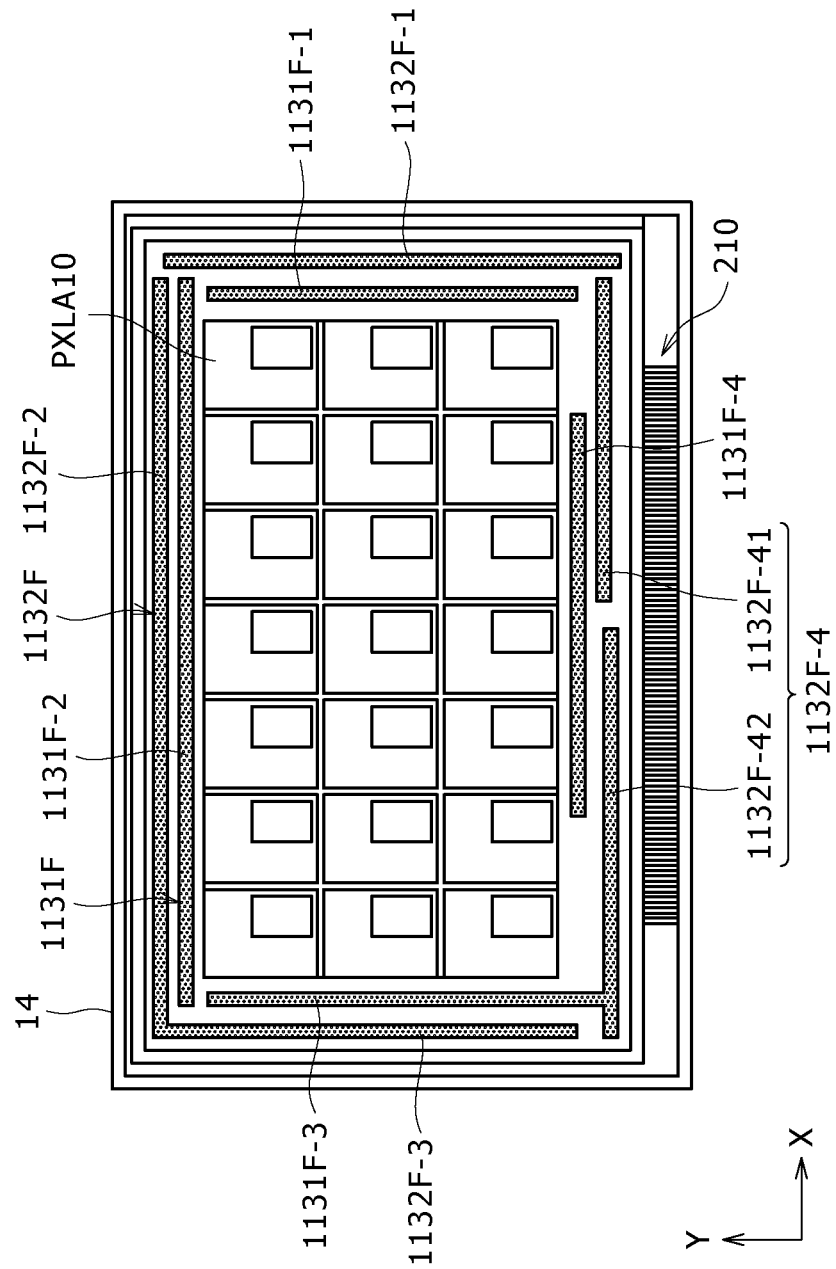

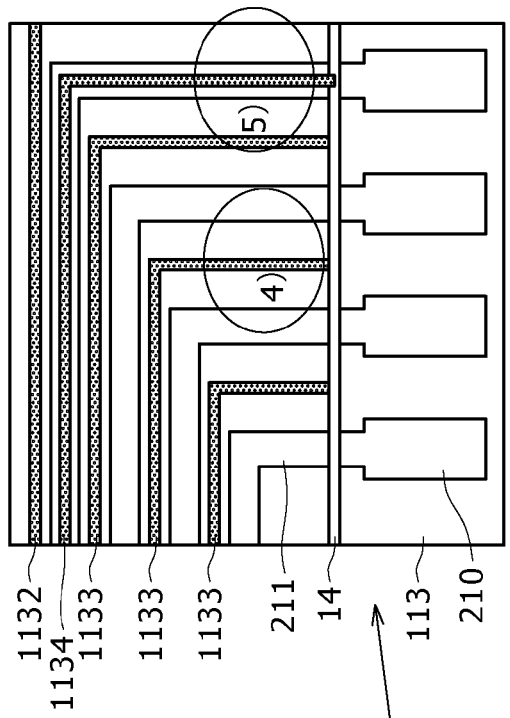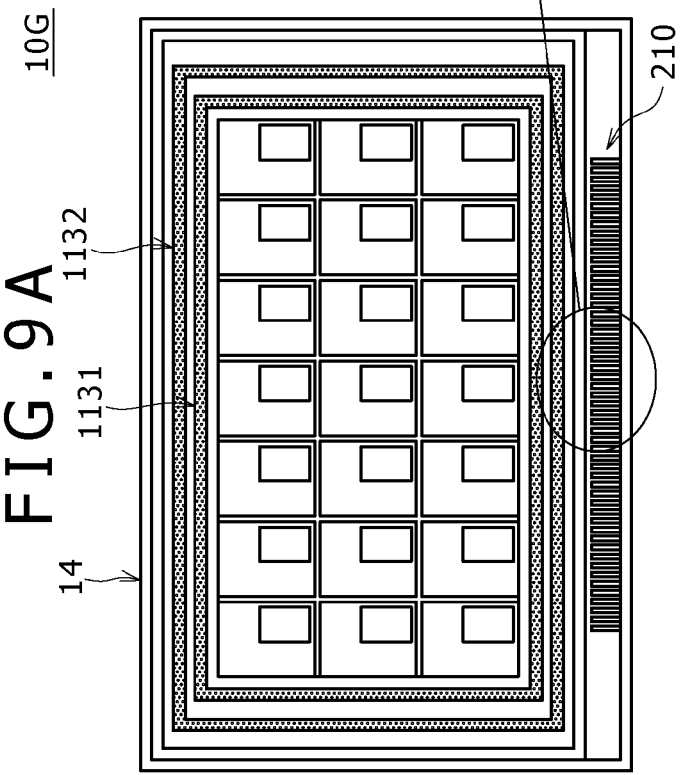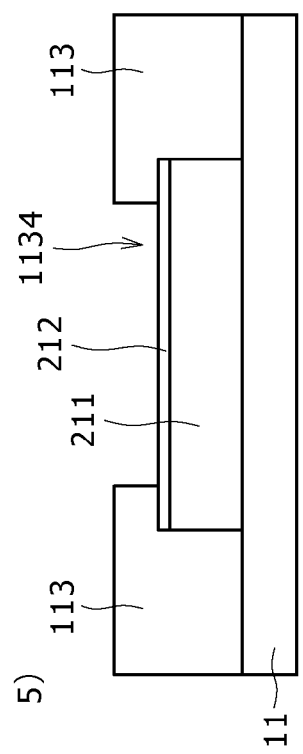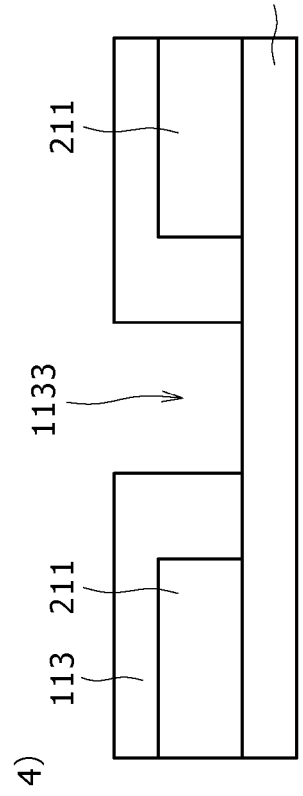

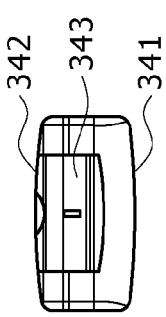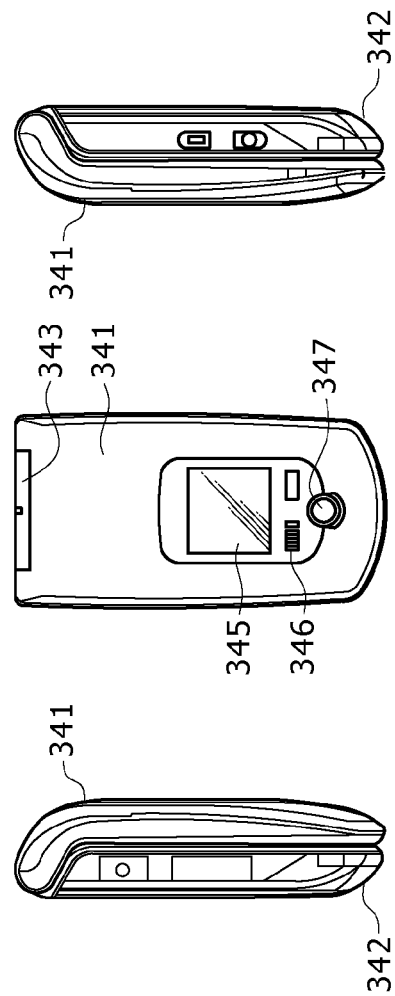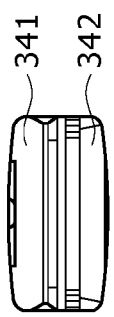

LIQUID CRYSTAL DISPLAY DEVICE AND ELECTRONIC EQUIPMENT

CROSS REFERENCES TO RELATED APPLICATIONS

The present invention contains subject matter related to Japanese Patent Application JP 2007-317705 filed in the Japan Patent Office on Dec. 7, 2007, the entire contents of which being incorporated herein by reference.

BACKGROUND OF THE INVENTION

1. Field of the Invention

The present invention relates to a liquid crystal display device and electronic equipment having an organic film as a planarizing layer.

2. Description of the Related Art

Liquid crystal display devices have found application in a wide variety of electronic equipment thanks to their slimness and low power consumption. Among examples of electronic equipment using a liquid crystal display device are laptop personal computers, display devices of car navigators, personal digital assistants or PDAs, mobile phones, digital cameras and video camcorders.

FIGS. 1A to 1C are views illustrating the configuration of a typical liquid crystal display device. FIG. 1A is a sectional view of the device structure. FIG. 1B is a plan view of a TFT (thin film transistor) substrate. FIG. 1C is a plan view of an opposed substrate.

A liquid crystal display device 1 includes an array substrate (substrate having active elements formed thereon) 2, an opposed substrate 3 and a liquid crystal layer 4. The opposed substrate 3 is a transparent substrate disposed to be opposed to the array substrate 2. The liquid crystal layer 4 is disposed between the substrates 2 and 3.

Pixels, each including a transparent electrode (pixel electrode) 21 and thin film transistor (TFT) 22, are arranged in a matrix form on the array substrate 2 to form a pixel area PXLA. The transparent electrode 21 applies a voltage to the liquid crystal. The thin film transistor 22 selects the transparent electrode 21.

To reduce the height differences on the thin film transistors 22, a planarizing layer 23 is formed between the thin film transistor 22 and transparent electrode 21 on the array substrate 2. The planarizing layer 23 includes an organic film.

A color filter section 31 is formed on the opposed substrate 3. The color filter section 31 includes, for example, black (BK), red (R), green (G) and blue (B) color filters associated with pixels PXL of the array substrate 2. A planarizing layer 32 is formed to reduce the height differences on the color filter section 31. The planarizing layer 32 includes an organic film.

On the side of the planarizing layer 32 facing the liquid crystal layer 4 is formed a transparent electrode 33 adapted to apply a voltage to the liquid crystal.

Further, a sealing area 5 is formed around the pixel area PXLA in which the pixels PXL are formed. The sealing area 5 is formed to hold the array and opposed substrates 2 and 3 together and to fill the liquid crystal.

As described above, structures such as metal wirings 24 including array drive terminals, transistor 22 and transparent electrode (transparent conductive film) 21 are provided on one of the two substrates opposed to each other, namely, the array substrate 24, in the typical liquid crystal display device 1. On the other hand, structures such as the color filters adapted to display an image in color are provided on the opposed substrate 3.

These structures produce height differences on the topmost surfaces of the substrates. This changes the distance between the substrates sandwiching the liquid crystal across their surfaces, thus resulting in a deviation of some optical characteristics of the liquid crystal pixels and degradation in image quality such as contrast.

To prevent these problems, the planarizing layers, each including an organic layer, are formed over the substrates so as to smooth out the height differences resulting, for example, from the wirings.

Further, the liquid crystal display device can provide improved intrasurface uniformity in optical characteristics if the organic films are extended beyond the sealing area adapted to hold the two substrates of the liquid crystal display device together and keep the liquid crystal trapped in the display device.

SUMMARY OF THE INVENTION

However, the organic films serving as a planarizing agent can contain several tenth of a percent to several percent of moisture.

As a result, the formation of organic films over the substrates has caused moisture and gases to find their way into the liquid crystal of the liquid crystal display device via the organic planarizing layers. This has led to degraded reliability of liquid crystal display devices under highly humid conditions.

It is preferable to provide a liquid crystal display device and electronic equipment which can prevent moisture penetration via organic planarizing layers for improved reliability and consistently high image quality.

A display device according to a first mode of the present invention includes first and second substrates, a liquid crystal layer and conductive section. The first substrate has a pixel area in which pixels are arranged in a matrix form. The second substrate is disposed to be opposed to the first substrate. The liquid crystal layer is disposed between the first and second substrates. The conductive section is disposed at least on the first of the first and second substrates to apply a voltage to liquid crystal. The display device according to the first mode of the present invention further includes an organic film, a sealing area and organic film-free area. The organic film is disposed at least over one of the first and second substrates. The sealing area holds the two substrates together at the edge portions of the substrates. The organic film-free area is free from an organic film and extends from the inward side of the outermost end of the sealing area to the outward side of the outer periphery of the pixel area.

The organic film-free area should preferably extend from the inward side of the outermost end of the sealing area to the outward side of the outer periphery of the pixel area and be free from an organic film partly in the direction parallel to the main surface of the substrate and wholly in the direction vertical to the main surface of the substrate.

The organic film-free area should preferably be formed continuously all around the pixel area.

The organic film-free area should preferably be formed partly non-continuously around the pixel area.

The organic film-free area should preferably be free from an organic film partly at a plurality of locations in the direction parallel to the main surface of the substrate and wholly in the direction vertical to the main surface of the substrate and extend from the inward side of the outermost end of the sealing area to the outward side of the outer periphery of the pixel area.

The substrates should preferably be free from an organic film on an inorganic film between metal wirings.

The substrates should preferably be free from an organic film on the top surface of the metal of the metal wirings, but not on the end surface thereof.

The transparent conductive section should preferably include a pixel electrode formed on the first substrate and an opposed electrode formed on the second substrate.

The transparent conductive section should preferably include a pixel electrode and opposed electrode formed on the first substrate.

First and second organic films should preferably be formed on the first and second substrates. The organic film-free area should preferably be formed at least in either of the first and second organic films.

A second mode of the present invention is electronic equipment having a liquid crystal display device. The liquid crystal display device includes first and second substrates, a liquid crystal layer and conductive section. The first substrate has a pixel area in which pixels are arranged in a matrix form. The second substrate is disposed to be opposed to the first substrate. The liquid crystal layer is disposed between the first and second substrates. The conductive section is disposed at least on the first of the first and second substrates to apply a voltage to the liquid crystal. The display device further includes an organic film, a sealing area and organic film-free area. The organic film is disposed at least over the substrate having the conductive section. The sealing area holds the two substrates together at the edge portions of the substrates. The organic film-free area is free from the organic film and extends from the inward side of the outermost end of the sealing area to the outward side of the outer periphery of the pixel area.

According to the present invention, moisture which has found its way into the display device via the organic film from outside of the substrate cannot penetrate further into the display device beyond the directions in which the organic film has been removed.

The present invention prevents moisture penetration via organic films, thus providing improved reliability and consistently high image quality.

BRIEF DESCRIPTION OF THE DRAWINGS

FIGS. 1A to 1C are views illustrating the configuration of a typical liquid crystal display device;

FIGS. 2A to 2C are views illustrating the configuration of an active matrix liquid crystal display device according to a first embodiment of the present invention;

FIGS. 4A to 4C are views illustrating the configuration of an active matrix liquid crystal display device according to a third embodiment of the present invention;

FIGS. 5A to 5C are views illustrating the configuration of an active matrix liquid crystal display device according to a fourth embodiment of the present invention;

FIGS. 6A to 6D are views illustrating the configuration of an active matrix liquid crystal display device according to a fifth embodiment of the present invention;

FIG. 7 is a view illustrating the configuration of an active matrix liquid crystal display device according to a sixth embodiment of the present invention;

FIG. 8 is a view illustrating the configuration of an active matrix liquid crystal display device according to a seventh embodiment of the present invention;

FIGS. 9A to 9D are views illustrating the configuration of an active matrix liquid crystal display device according to an eighth embodiment of the present invention;

FIGS. 15A to 15G are views illustrating a personal digital assistant such as mobile phone to which the present embodiment is applied.

DETAILED DESCRIPTION OF THE PREFERRED EMBODIMENTS

Figure 3A:
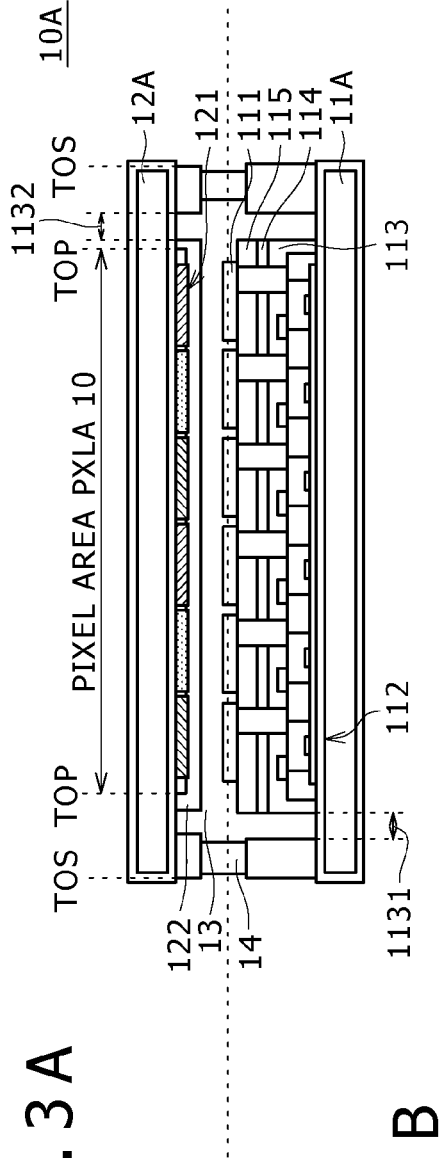
FIGS. 3A to 3C are views illustrating the configuration of an active matrix liquid crystal display device according to a second embodiment of the present invention.

The preferred embodiments of the present invention will be described below with reference to the accompanying drawings.

First Embodiment

FIGS. 2A to 2C are views illustrating the configuration of an active matrix liquid crystal display device according to a first embodiment of the present invention. FIG. 2A is a sectional view of the device structure. FIG. 2B is a plan view of the TFT substrate. FIG. 2C is a plan view of the opposed substrate.

The liquid crystal display (LCD) device 10 according to the present embodiment includes an array substrate (substrate having active elements formed thereon) 11, opposed substrate 12 and a liquid crystal layer 13. The opposed substrate 12 is a transparent substrate disposed to be opposed to the array substrate 11 to serve as a second substrate. The liquid crystal layer 13 is disposed between the array and opposed substrates 11 and 12.

In the case of a transmissive liquid crystal display device, the array substrate 11 is formed, for example, with a quartz substrate. In the case of a reflective liquid crystal display device, the array substrate 11 is formed, for example, with a silicon substrate. The opposed substrate 12 is formed, for example, with a glass or quartz substrate.

The pixels PXL, each including a transparent electrode (pixel electrode, transparent conductive film) 111 and thin film transistor (TFT) 112, are arranged in a matrix form on the array substrate 11 to form a pixel area PXLA10. The transparent electrode 111 applies a voltage to the liquid crystal. The thin film transistor 112 selects the transparent electrode 111.

To reduce the height differences on the thin film transistors 112, a planarizing layer 113 is formed between the thin film transistor 112 and transparent electrode 111 on the array substrate 11. The planarizing layer 113 includes a first organic film.

A color filter section 121 is formed on the opposed substrate 12. The color filter section 121 includes, for example, black (BK), red (R), green (G) and blue (B) color filters associated with the pixels PXL of the array substrate 11. A planarizing layer 122 is formed to reduce the height differences on the color filter section 121. The planarizing layer 122 includes a second organic film.

On the side of the planarizing layer 122 facing the liquid crystal layer 13 is formed a transparent electrode 123 adapted to apply a voltage to the liquid crystal.

Further, a sealing area 14 is formed with a given sealing agent around the pixel area PXLA10 in which the pixels PXL are formed. The sealing area 14 is formed to hold the array and opposed substrates 11 and 12 together and to fill the liquid crystal.

The transparent electrodes 111 and 123 are formed, for example, with an ITO film (indium-tin oxide film) or other transparent conductive thin film.

An LCD panel 20 is formed with the components described above.

Array drive terminals 210 including metal wirings are formed on one edge portion of the array substrate 11 which makes up the LCD panel 20.

The liquid crystal display device 10 according to the present embodiment has a characteristic shape of the planarizing layers of the array substrate 11 and opposed substrate 12 or either of the two substrates. The planarizing layers each include an organic film.

In the first embodiment, an organic film-free area 1131 is formed on the array substrate 11. The organic film-free area 1131 is free from the organic film partly in the direction parallel (X direction of the XY coordinates in FIG. 2) to a main surface 11a of the array substrate 11 and wholly in the direction vertical (Y direction of the XY coordinates in FIG. 2) to the main surface 11a of the array substrate 11. The same area 1131 extends from the inward side of an outermost end TOS of the sealing area 14 to the outward side of an outer periphery TOP of the pixel area PXLA10.

Similarly, in the first embodiment, an organic film-free area 1221 is formed on the opposed substrate 12. The organic film-free area 1221 is free from the organic film partly in the direction parallel (X direction of the XY coordinates in FIG. 2A) to a main surface 12a of the opposed substrate 12 (main surface 11a of the array substrate 11) and wholly in the direction vertical (Y direction of the XY coordinates in FIG. 2A) to the main surface 12a of the opposed substrate 12 (main surface 11a of the array substrate 11). The same area 1221 extends from the inward side of the outermost end TOS of the sealing area 14 to the outward side of the outer periphery TOP of the pixel area PXLA10.

In the present embodiment, the organic film-free areas 1131 and 1221 are formed continuously all around the pixel area PXLA10 as illustrated in FIGS. 2B and 2C.

That is, organic film-free areas 1131-1, 1131-2, 1131-3 and 1131-4 are formed continuously on the array substrate 11 so as to communicate with each other. The same areas 1131-1, 1131-2, 1131-3 and 1131-4 are opposed to the four side portions of the pixel area PXLA10.

Similarly, organic film-free areas 1221-1, 1221-2, 1221-3 and 1221-4 are formed continuously on the opposed substrate 12 so as to communicate with each other. The same areas 1221-1, 1221-2, 1221-3 and 1221-4 are opposed to the four side portions of the color filter section 121.

As described above, in the first embodiment, the organic film-free areas 1131 and 1221 are formed respectively on the array and opposed substrates 11 and 12. The organic film-free areas 1131 and 1221 are free from the organic films which make up the planarizing layers 113 and 122. Each of the same areas 1131 and 1221 extends from the inward side of the outermost end TOS of the sealing area 14 to the outward side of the outer periphery TOP of the pixel area PXLA10. As a result, moisture which has found its way into the display panel 20 via the organic films from outside of the substrates cannot penetrate further into the display panel 20 beyond the directions in which the organic film has been removed.

Further, moisture can be effectively prevented from penetrating into the LCD panel 20 by providing the organic film-free areas all around the pixel area PXLA10.

Still further, the height under the sealing area 14, adapted to support both of the array and color filter substrates, can be aligned with the height of the pixel area by forming the organic film-free areas 1131 and 1221 on the inward side of the outermost end TOS of the sealing area 14. This provides higher image quality of the display panel.

As described above, the liquid crystal display device according to the first embodiment includes the array substrate (first substrate) 11, opposed substrate (second substrate) 12, liquid crystal layer 13 and sealing area 14. The array substrate 11 has the pixel area PXLA10 in which the pixels PXL are arranged in a matrix form. The opposed substrate 12 is disposed to be opposed to the array substrate 11. The liquid crystal layer 13 is disposed between the array and opposed substrates 11 and 12. The sealing area 14 is formed to hold the array and opposed substrates 11 and 12 together and to fill the liquid crystal. The same area 14 is formed around the pixel area PXLA10 in which the pixels PXL are arranged in a matrix form.

The pixels PXL, each including the transparent electrode (pixel electrode) 111 and thin film transistor (TFT) 112, are arranged in a matrix form on the array substrate 11 to form the pixel area PXLA10. The transparent electrode 111 applies a voltage to the liquid crystal. The thin film transistor 112 selects the transparent electrode 111. The planarizing layer 113 is formed between the thin film transistor 112 and transparent electrode 111 on the array substrate 11. The planarizing layer 113 includes a first organic film. On the opposed substrate 12 is formed the color filter section 121 associated with the pixels PXL of the array substrate 11. The planarizing layer 122 is formed to reduce the height differences on the color filter section 121. The planarizing layer 122 includes a second organic film. On the side of the planarizing layer 122 facing the liquid crystal layer 13 is formed with the transparent electrode 123 adapted to apply a voltage to the liquid crystal. The organic film-free areas 1131 and 1221 are formed respectively on the array and opposed substrates 11 and 12. The organic film-free areas 1131 and 1221 are free from the organic films which make up the planarizing layers 113 and 122. Each of the same areas 1131 and 1221 extends from the inward side of the outermost end TOS of the sealing area 14 to the outward side of the outer periphery TOP of the pixel area PXLA10. This prevents moisture penetration via the organic films, thus providing improved reliability and consistently high image quality.

Second Embodiment

Figure 3B:
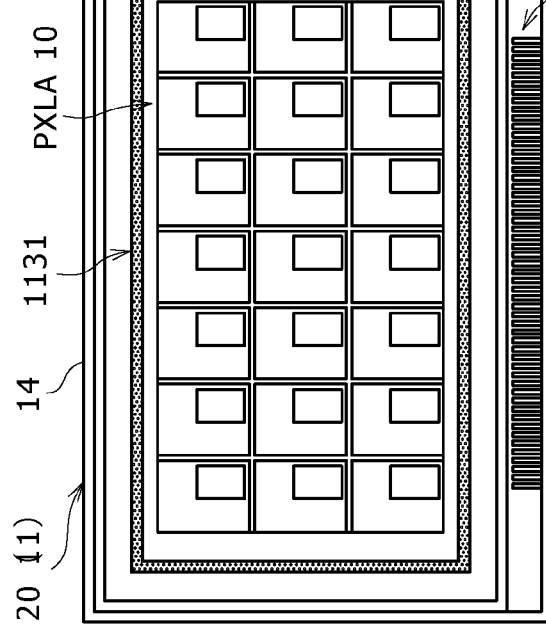
Figure 3C:
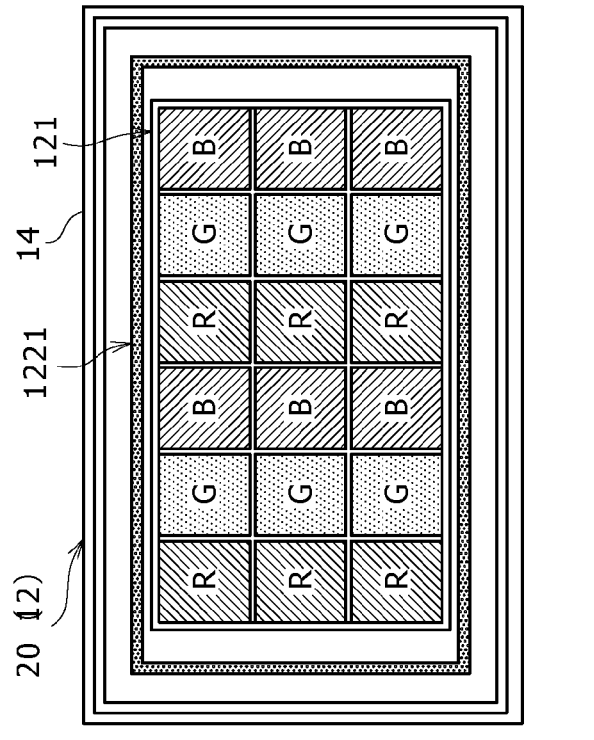

FIGS. 3A to 3C are views illustrating the configuration of an active matrix liquid crystal display device according to a second embodiment of the present invention. FIG. 3A is a sectional view of the device structure. FIG. 3B is a plan view of the TFT substrate. FIG. 3C is a plan view of the opposed substrate.

A display device 10A according to the second embodiment differs from the display device 10 according to the first embodiment in that the same device 10A has an FFS (Fringe Field Switching) structure to provide a wide view angle.

That is, the display device 10A has an opposed transparent electrode disposed on an array substrate 11A, but not on an opposed substrate 12A.

More specifically, an opposed electrode 114 is formed on a planarizing layer 113A on the array substrate 11A. The planarizing layer 113A includes an organic film. On the opposed electrode 114 is formed a pixel insulating film 115. Pixel electrodes (transparent electrodes for a transmissive liquid crystal display device) 111 are formed on the pixel insulating film 115 on the interface side with the liquid crystal layer 13.

As described above, the liquid crystal display device 10A has the pixel electrodes 111, pixel insulating film 115 and opposed electrodes 114 on the array substrate 11A so that the pixel insulating film 115 is sandwiched between the pixel electrodes 111 and opposed electrodes 114. As a result, the liquid crystal is driven by an electric field approximately parallel to the main surface 11a of the array substrate 11A.

In the second embodiment, the organic film-free areas 1131 and 1221 are also formed respectively on the array and opposed substrates 11 and 12, as in the first embodiment. The organic film-free areas 1131 and 1221 are free from the organic films which make up the planarizing layers 113 and 122. Each of the same areas 1131 and 1221 extends from the inward side of the outermost end TOS of the sealing area 14 to the outward side of the outer periphery TOP of the pixel area PXLA10.

As a result, moisture which has found its way into the display panel 20 via the organic film from outside of the substrate cannot penetrate further into the display panel 20 beyond the directions in which the organic film has been removed.

Moisture can be effectively prevented from penetrating into the LCD panel 20 by providing the organic film-free areas all around the pixel area PXLA10.

Thus, the present embodiment provides the same advantageous effects as in the first embodiment even when the organic film-free areas 1131 and 1221 are applied to the liquid crystal display device 10A having an FFS structure.

Third Embodiment

FIGS. 4A to 4C are views illustrating the configuration of an active matrix liquid crystal display device according to a third embodiment of the present invention. FIG. 4A is a sectional view of the device structure. FIG. 4B is a plan view of the TFT substrate. FIG. 4C is a plan view of the opposed substrate.

A display device 10B according to the third embodiment differs from the display device 10 according to the first embodiment in that an organic film-free area is formed only on the array substrate 11, but not on the opposed substrate 12.

Thus, the present invention prevents moisture penetration via the organic planarizing film for improved reliability and consistently high image quality even when the organic film-free area 1131 is provided only on the array substrate 11.

It should be noted that the configuration having the organic film-free area 1131 only on the array substrate 11 is also applicable to the liquid crystal display devices having an FFS structure.

Fourth Embodiment

FIGS. 5A to 5C are views illustrating the configuration of an active matrix liquid crystal display device according to a fourth embodiment of the present invention. FIG. 5A is a sectional view of the device structure. FIG. 5B is a plan view of the TFT substrate. FIG. 5C is a plan view of the opposed substrate.

A display device 10C according to the fourth embodiment differs from the display device 10 according to the first embodiment in that an organic film-free area is formed only on the opposed substrate 12, but not on the array substrate 11.

Thus, the present invention prevents moisture penetration via the organic planarizing film for improved reliability and consistently high image quality even when the organic film-free area 1221 is provided only on the opposed substrate 12.

It should be noted that the configuration having the organic film-free area 1221 only on the opposed substrate 12 is also applicable to the liquid crystal display devices having an FFS structure.

Fifth Embodiment

FIGS. 6A to 6D are views illustrating the configuration of an active matrix liquid crystal display device according to a fifth embodiment of the present invention. FIG. 6A is a plan view of the TFT substrate. FIG. 6B to 6D are views illustrating the arrangement relationship between the non-continuous organic film-free areas in enlarged fashion.

A display device 10D according to the fifth embodiment differs from the display devices 10 to 10C according to the first to fourth embodiments in that an organic film-free area 1131D is formed partly non-continuously rather than continuously all around the pixel area PXLA10 in a complete ring shape.

In this example, organic film-free areas 1131D-1, 1131D-2 and 1131D-3 are opposed to the three edges (sides) of the pixel area PXLA10 which are not opposed to the array drive terminals 210. The organic film-free areas 1131D-1, 1131D-2 and 1131D-3 are formed continuously. An organic film-free area 1131D-4 is opposed to the edge (side) of the pixel area PXLA10 which is opposed to the array drive terminals 210. The organic film-free area 1131D-4 is divided into two non-continuous organic film-free areas 1131D-41 and 1131D-42.

One end portion (left end portion in FIG. 6A) of the divided organic film-free area 1131D-41 and one end portion (right end portion in FIG. 6A) of the divided organic film-free area 1131D-42 are formed to overlap each other with a given gap therebetween. This makes it difficult for moisture and gases to directly penetrate into the pixel area PXLA10.

Further, the other end portion (right end portion in FIG. 6A) of the divided organic film-free area 1131D-41 and the side portion of the organic film-free area 1131D-1 are formed with a given gap therebetween. This makes it difficult for moisture and gases to directly penetrate into the pixel area PXLA10.

Still further, the other end portion (left end portion in FIG. 6A) of the divided organic film-free area 1131D-42 and the end portion of the organic film-free area 1131D-3 are formed with a given gap therebetween. This makes it difficult for moisture and gases to directly penetrate into the pixel area PXLA10.

The gap between the other end portion (right end portion in FIG. 6A) of the divided organic film-free area 1131D-41 and the side portion of the organic film-free area 1131D-1 is set to A1 as illustrated in FIG. 6B.

The gap between the one end portion (left end portion in FIG. 6A) of the divided organic film-free area 1131D-41 and the one end portion (right end portion in FIG. 6A) of the divided organic film-free area 1131D-42 is set to A2 as illustrated in FIG. 6C.

The gap between the other end portion (left end portion in FIG. 6A) of the divided organic film-free area 1131D-42 and the end portion of the organic film-free area 1131D-3 is set to A3 as illustrated in FIG. 6D.

As described above, moisture can be effectively prevented from penetrating into the LCD panel 20 by forming the organic film-free areas all around the pixel area PXLA10 as seen in the vertical direction relative to the main surface 11*a* of the array substrate 11 so that the gaps A1, A2, A3 and so on between the non-continuous portions are 1 mm or less.

Although the case has been described in which the present configuration is applied to the array substrate, the present configuration is also applicable to the opposed substrate 12.

Sixth Embodiment

FIG. 7 is a view illustrating the configuration of an active matrix liquid crystal display device according to a sixth embodiment of the present invention.

A display device 10E according to the sixth embodiment differs from the display devices 10 to 10D according to the first to fifth embodiments in that a plurality of (two, three or more) organic film-free areas are formed continuously all around the pixel area PXLA10 in a complete ring shape (two in the example shown in FIG. 7).

That is, the organic film-free area 1131 is formed on the array substrate 11. The organic film-free area 1131 is free from the organic film partly at a plurality of locations in the direction parallel (X direction of the XY coordinates in FIG. 7) to the main surface 11*a* of the array substrate 11 and wholly in the direction vertical (Y direction of the XY coordinates in FIG. 7) to the main surface 11*a* of the array substrate 11. The same area 1131 extends from the inward side of the outermost end TOS of the sealing area 14 to the outward side of the outer periphery TOP of the pixel area PXLA10.

In the example shown in FIG. 7, two organic film-free areas, i.e., the organic film-free area 1131 and an organic film-free area 1132, are formed.

The organic film-free areas 1131-1, 1131-2, 1131-3 and 1131-4 are formed continuously on the array substrate 11 so as to communicate with each other. The same areas 1131-1, 1131-2, 1131-3 and 1131-4 are opposed to the four side portions of the pixel area PXLA10.

Similarly, organic film-free areas 1132-1, 1132-2, 1132-3 and 1132-4 are formed continuously all around the organic film-free areas 1131 so as to communicate with each other. The same areas 1132-1, 1132-2, 1132-3 and 1132-4 are opposed to the four side portions of the pixel area PXLA10.

As described above, moisture penetration can be more effectively prevented by providing two, three or more organic film-free areas.

Seventh Embodiment

FIG. 8 is a view illustrating the configuration of an active matrix liquid crystal display device according to a seventh embodiment of the present invention.

A display device 10F according to the seventh embodiment differs from the display device 10E according to the sixth embodiment in that organic film-free areas 1131F and 1132F are formed partly non-continuously rather than continuously all around the pixel area PXLA10 in a complete ring shape.

In this example, the organic film-free area 1132F is formed non-continuously. That is, an organic film-free area 1132F-4 is divided into organic film-free areas 1132F-41 and 1132F-42. The organic film-free area 1132F-4 is opposed to one edge (side) portion of the pixel area PXLA10 on the side of the array drive terminals 210.

Further, the organic film-free area 1131F is formed non-continuously. That is, an organic film-free area 1131F-4 is formed shorter than the edge (side) portion of the pixel area PXLA10 on the side of the array drive terminals 210 to which the organic film-free area 1131F-4 is opposed. The organic film-free area 1131F-4 is positioned along the center portion of the edge (side) portion thereof.

Still further, organic film-free areas 1131F-1 to 1131F-3 and the organic film-free area 1131F-4 are basically formed non-continuously from each other at the end portions thereof.

The end portion (lower end portion in FIG. 8) of the organic film-free area 1131F-3 and the one end portion (left end portion in FIG. 8) of the divided organic film-free area 1132F-42 are formed continuously to communicate with each other.

Further, the leftmost end portion of the divided organic film-free area 1132F-42 is extended to be opposed to the lower end portion of the second organic film-free area 1132F-3.

The other end portion (right end portion in FIG. 8) of the organic film-free area 1132F-42 and the one end portion (left end portion in FIG. 8) of the organic film-free area 1132F-41 are formed with a given gap therebetween.

The organic film-free area 1131F-4 is formed to overlap the organic film-free areas 1132F-41 and 1132F-42, which are formed non-continuously from each other, with a given gap therebetween. All the above makes it difficult for moisture and gases to directly penetrate into the pixel area PXLA10.

The other end portion (right end portion in FIG. 8) of the organic film-free area 1132F-41 is formed non-continuously from the lower end portion of the organic film-free area 1131F-1 and the side portion of the organic film-free area 1132F-1 with a given gap therebetween.

The upper end portion of the organic film-free area 1132F-3 is formed continuously with the one end portion (left end portion in FIG. 8) of the organic film-free area 1132F-2 so as to communicate with each other.

The other end portion (right end portion in FIG. 8) of the organic film-free area 1132F-2 and the upper end portion of the organic film-free area 1132F-1 are formed non-continuously from each other with a given gap therebetween.

As described above, moisture can be effectively prevented from penetrating into the LCD panel 20 by forming the organic film-free areas all around the pixel area PXLA10 as seen in the vertical direction relative to the main surface 11*a* of the array substrate 11 so that the gaps between the non-continuous portions are 1 mm or less.

Although the case has been described in which the present configuration is applied to the array substrate, the present configuration is also applicable to the opposed substrate 12.

Eighth Embodiment

FIGS. 9A to 9D are views illustrating the configuration of an active matrix liquid crystal display device according to an eighth embodiment of the present invention. FIG. 9A is a plan view of the TFT substrate. FIG. 9B is an enlarged view of the array drive terminals shown in FIG. 9A. FIG. 9C is a simplified sectional view of the portion shown in FIG. 9B having an organic film-free area between metal wirings. FIG. 9D is a simplified sectional view of the portion shown in FIG. 9B having a barrier metal layer for the transparent electrode.

In a liquid crystal display device 10G according to the eighth embodiment, the substrate is free from the organic planarizing layer 113 on an inorganic film between metal wirings 211 as illustrated in FIG. 9C.

Further, in the liquid crystal display device 10G according to the eighth embodiment, the substrate is free from the organic film on the top surface of the metal of the metal wirings 211, but not on the end surface thereof.

If there is an organic film on the metal wirings 211 of the array substrate 11, the sealing area 14 cannot cross over the metal wirings 211 so that the end portions thereof are visible.

The reason for this is that corrosion may occur if the transparent electrode such as ITO which will be formed later comes in contact with the end surfaces of the wirings.

In order to avoid corrosion and prevent moisture penetration, an organic film-free area 1133 is formed between the metal wirings 211 in the eighth embodiment as illustrated in FIGS. 9B and 9C.

Further, if the metal surface portion has a barrier metal layer 212 for the transparent electrode, an organic film-free area 1134 is formed on the metal wiring 211.

Corrosion and moisture penetration can be prevented by leaving the organic film unremoved from the end surfaces of the metal wirings.

As described above, the present embodiment prevents moisture penetration into the liquid crystal display device via the organic films. This prevents moisture penetration into the liquid crystal, thus providing improved reliability of the liquid crystal display device.

Further, the present embodiment provides the above advantageous effects irrespective of the layout of the metal wirings of the array substrate.

It should be noted that the present invention is expected to provide the above advantageous effects also when applied to both of rotary polarization mode and birefringence mode liquid crystal display devices, including simple matrix, TFT active matrix and TFD (thin film diode) active matrix display devices.

Figure 10:
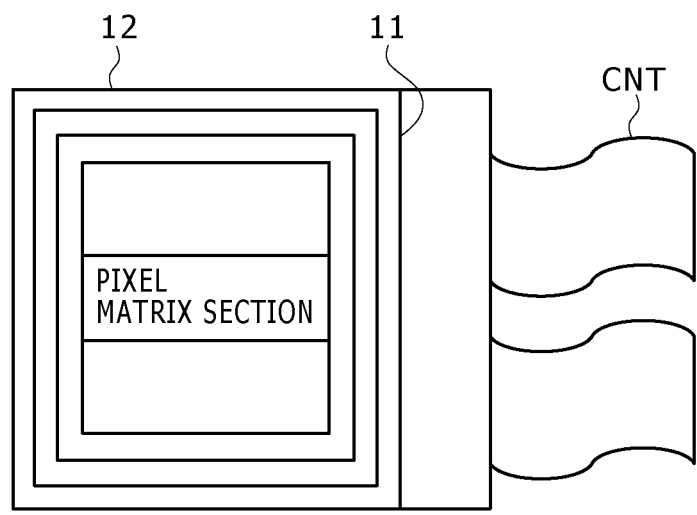
FIG. 10 is a diagrammatic sketch illustrating an example of a flat display device in a modular form.

The display device according to the present invention includes a flat display device in a modular form as illustrated in FIG. 10. For example, liquid crystal and a pixel array section is provided on the insulating substrate 11. The pixel array section has pixels integrated and formed in a matrix. Each of the pixels includes a thin film transistor and other components. An adhesive is applied around the pixel array section (pixel matrix section), after which the opposed substrate made of glass or other material is attached for use as a display module. This transparent opposed substrate 12 may have a color filter, protective film, light-shielding film and so on as described earlier as necessary. An FPC (flexible printed circuit), adapted to allow exchange of signals or other information between external equipment and the pixel array section, may be provided as a connector CNT on the display module.

The aforementioned display device according to the present embodiment is applicable as a display of a wide range of electronic equipment including a digital camera, laptop personal computer, PDA such as mobile phone and video camcorder illustrated in FIGS. 11 to 15G. These pieces of equipment are designed to display an image or video of a video signal fed to or generated inside the electronic equipment.

Specific examples of electronic equipment, to which the present embodiment is applied, will be given below.

Figure 11:
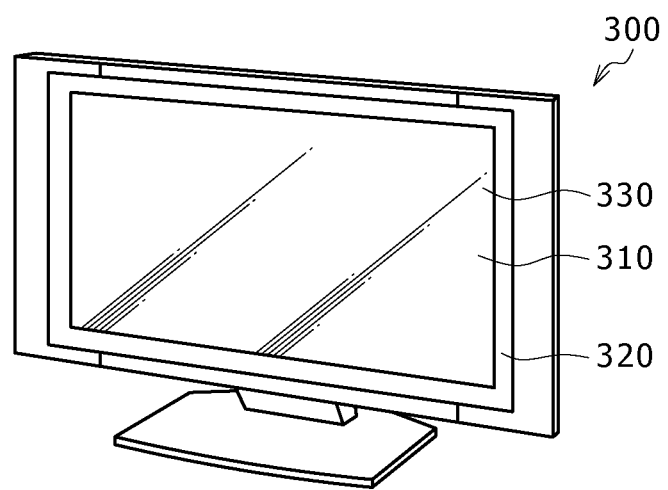
FIG. 11 is a perspective view illustrating a television set to which the present embodiment is applied.

FIG. 11 is a perspective view illustrating a television set to which the present embodiment is applied. A television set 300 according to the present application example includes a video display screen section 310 made up, for example, of a front panel 320, a filter glass 330 and other parts. The television set is manufactured by using the display device according to the present embodiment as the video display screen section 310.

Figure 12A:
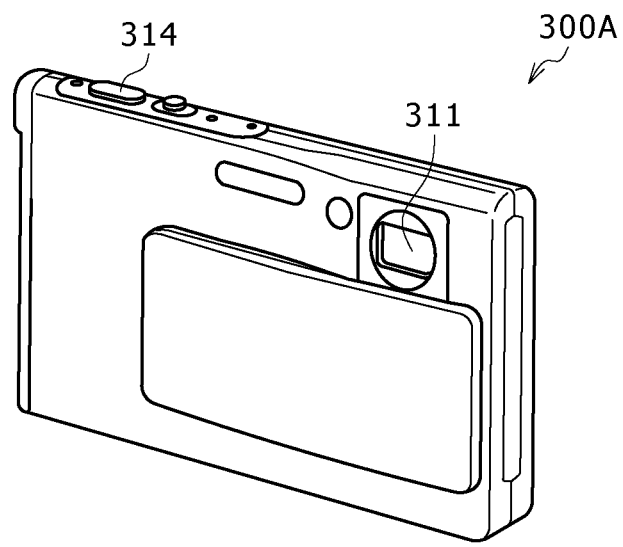
FIGS. 12A and 12B are perspective views illustrating a digital camera to which the present embodiment is applied.
Figure 12B:
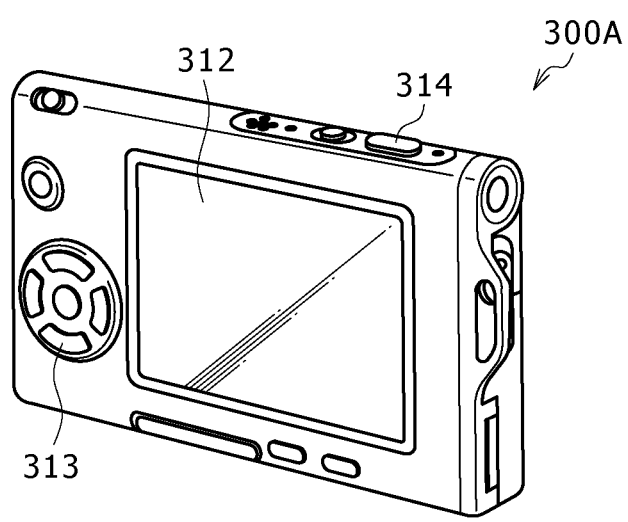

FIGS. 12A and 12B are views illustrating a digital camera to which the present embodiment is applied. FIG. 12A is a perspective view of the digital camera as seen from the front, and FIG. 12B is a perspective view thereof as seen from the rear. A digital camera 300A according to the present application example includes a flash-emitting section 311, a display section 312, a menu switch 313, a shutter button 314 and other parts. The digital camera is manufactured by using the display device according to the present embodiment as the display section 312.

Figure 13:
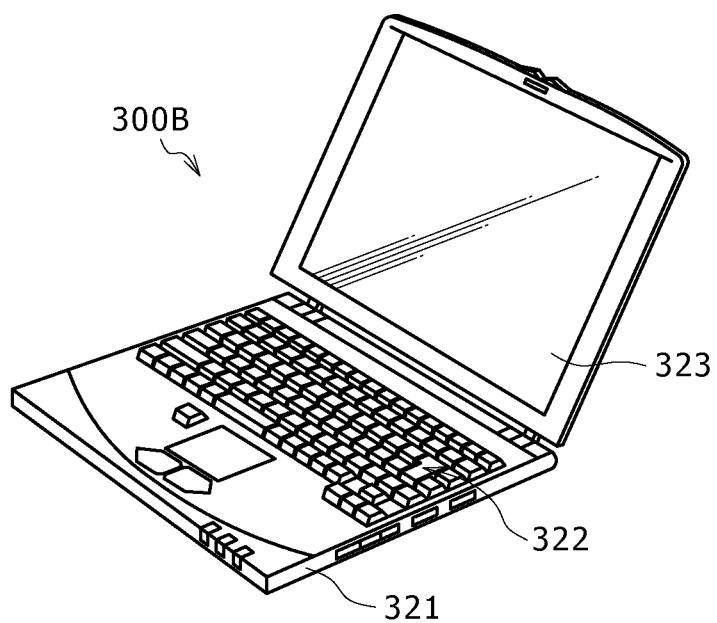
FIG. 13 is a perspective view illustrating a laptop personal computer to which the present embodiment is applied.

FIG. 13 is a perspective view illustrating a laptop personal computer to which the present embodiment is applied. A laptop personal computer 300B according to the present application example includes, in a main body 321, a keyboard 322 adapted to be manipulated for entry of text or other information, a display section 323 adapted to display an image, and other parts. The laptop personal computer is manufactured by using the display device according to the present embodiment as the display section 323.

Figure 14:
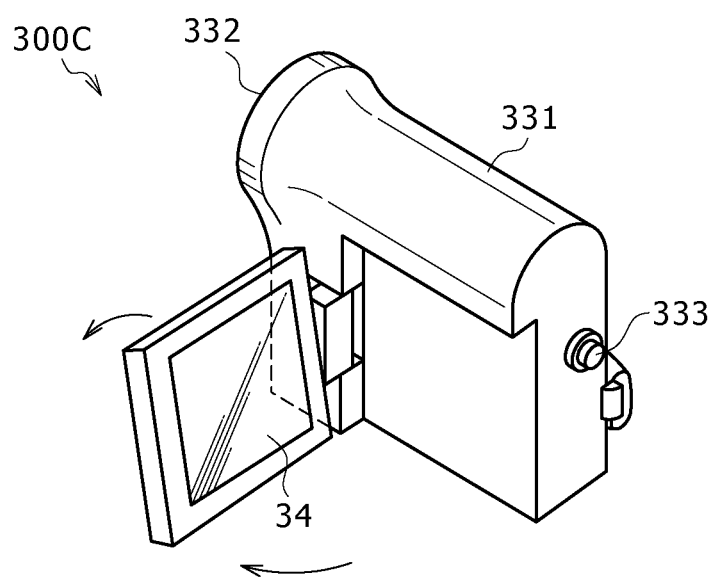
FIG. 14 is a perspective view illustrating a video camcorder to which the present embodiment is applied.

FIG. 14 is a perspective view illustrating a video camcorder to which the present embodiment is applied. A video camcorder 300C according to the present application example includes a main body section 331, a lens 332 provided on the front-facing side surface to capture the image of the subject, an imaging start/stop switch 333, a display section 334 and other parts. The video camcorder is manufactured by using the display device according to the present embodiment as the display section 334.

FIGS. 15A to 15G are perspective views illustrating a PDA such as mobile phone to which the present embodiment is applied. FIG. 15A is a front view of the mobile phone in an open position. FIG. 15B is a side view thereof. FIG. 15C is a front view of the mobile phone in a closed position. FIG. 15D is a left side view. FIG. 15E is a right side view. FIG. 15F is a top view. FIG. 15G is a bottom view. The mobile phone according to the present application example includes an upper enclosure 341, a lower enclosure 342, a connecting section (hinge section in this example) 343, a display 344, a sub-display 345, a picture light 346, a camera 347 and other parts. The mobile phone is manufactured by using the display device according to the present embodiment as the display 344 and sub-display 345.

It should be understood by those skilled in the art that various modifications, combinations, sub-combinations and alternations may occur depending on design requirements and other factors insofar as they are within the scope of the appended claims or the equivalent thereof.

What is claimed is:

1. A liquid crystal display device comprising:
    a first substrate having a pixel area in which pixels are arranged in a matrix form;
    a second substrate disposed to be opposed to the first substrate;
    a liquid crystal layer disposed between the first and second substrates;
    a conductive section disposed at least on the first substrate to apply a voltage to the liquid crystal layer;
    an organic film disposed at least on one of the first and second substrates, except for at least two circumferential organic film-free areas; and
    a sealing area with a sealant adapted to hold the first and second substrates together at peripheral portions of the first and second substrates,
    wherein,
        the sealant maintains the first and second substrates in spaced apart relation,
        each of the at least two circumferential organic film-free areas is an area free from the organic film and extends from no farther than the inward side of the outermost end of the sealing area to the outward side of the outer periphery of the pixel area,
        each of the at least two circumferential organic film-free areas is continuous about the pixel area so as to completely surround the pixel area, and at least one circumferential organic film-free area extends completely between the first and second substrates in a region that is free from the sealant.

2. The liquid crystal display device of claim 1, wherein each of the at least two circumferential organic film-free areas is free from the organic film partly in the direction parallel to the main surface of the substrate and wholly in the direction vertical to the main surface of the substrate and extends from the inward side of the outermost end of the sealing area to the outward side of the outer periphery of the pixel area.

3. The liquid crystal display device of claim 2, wherein the substrate is free from the organic film on an inorganic film between metal wirings.

4. The liquid crystal display device of claim 2, further comprising metal wirings, wherein the substrate is free from the organic film on a top surface of the metal of the metal wirings, but not on an end surface of the metal wirings.

5. The liquid crystal display device of claim 2, wherein the conductive section comprises a pixel electrode formed on the first substrate and an opposed electrode formed on the second substrate.

6. The liquid crystal display device of claim 5, wherein:
first and second organic films are formed on the first and second substrates, respectively, and
the at least two circumferential organic film-free areas are formed at least in either of the first and second organic films.

7. The liquid crystal display device of claim 2, wherein a transparent conductive section comprises a pixel electrode and opposed electrode formed on the first substrate.

8. The liquid crystal display device of claim 7, wherein:
first and second organic films are formed on the first and second substrates, respectively, and
the at least two circumferential organic film-free areas are formed at least in either of the first and second organic films.

9. An apparatus having a liquid crystal display device, the liquid crystal display device comprising:
a first substrate having a pixel area in which pixels are arranged in a matrix form;
a second substrate disposed to be opposed to the first substrate;
a liquid crystal layer disposed between the first and second substrates;
a conductive section disposed at least on the first substrate to apply a voltage to the liquid crystal layer;
an organic film disposed at least on the first substrate, except for at least two circumferential organic film-free areas; and
a sealing area with a sealant adapted to hold the first and second substrates together at peripheral portions of the first and second substrates,
wherein,
the sealant maintains the first and second substrates in spaced apart relation,
each of the at least two circumferential organic film-free areas is an area free from the organic film and extends from no farther than the inward side of the outermost end of the sealing area to the outward side of the outer periphery of the pixel area,
each of the at least two circumferential organic film-free areas is continuous about the pixel area so as to completely surround the pixel area, and
at least one circumferential organic film-free area completely extends between the first and second substrates in a region that is free from the sealant.

10. The apparatus of claim 9, wherein each of the at least two circumferential organic film-free areas is free from the organic film partly in the direction parallel to the main surface of the substrate and wholly in the direction vertical to the main surface of the substrate and extends from the inward side of the outermost end of the sealing area to the outward side of the outer periphery of the pixel area.

* * * * *